(12) United States Patent
Norris

(10) Patent No.: US 9,539,447 B2
(45) Date of Patent: Jan. 10, 2017

(54) SAFETY HARNESS SYSTEM FOR A TWO PIECE CLIMBING TREE STAND

(71) Applicant: BNR Technology Development LLC, Conroe, TX (US)

(72) Inventor: Jeffrey B. Norris, Montgomery, TX (US)

(73) Assignee: BNR Technology Development, LLC, Conroe, TX (US)

( * ) Notice: Subject to any disclaimer, the term of this patent is extended or adjusted under 35 U.S.C. 154(b) by 0 days.

(21) Appl. No.: 14/512,538

(22) Filed: Oct. 13, 2014

(65) Prior Publication Data

US 2015/0027809 A1 Jan. 29, 2015

Related U.S. Application Data

(62) Division of application No. 13/900,297, filed on May 22, 2013.

(51) Int. Cl.
| | | |
|---|---|---|
| A01M 31/02 | (2006.01) | |
| A62B 35/00 | (2006.01) | |
| E04G 3/30 | (2006.01) | |
| E04G 3/32 | (2006.01) | |

(52) U.S. Cl.
CPC .......... *A62B 35/0025* (2013.01); *A01M 31/02* (2013.01); *A62B 35/0075* (2013.01); *E04G 3/30* (2013.01); *E04G 3/32* (2013.01); *A62B 35/0068* (2013.01); *Y10T 24/31* (2015.01)

(58) Field of Classification Search
CPC ............ E04G 3/30; E04G 3/32; A01M 31/02; Y10T 24/31; A62B 35/0068; A62B 35/0025; A62B 35/0078

USPC ........................................................ 182/112
See application file for complete search history.

(56) References Cited

U.S. PATENT DOCUMENTS

| | | | | |
|---|---|---|---|---|
| 5,086,874 | A * | 2/1992 | Treants .......................... | 182/136 |
| 5,937,969 | A * | 8/1999 | Woller et al. ................. | 182/187 |
| 6,082,492 | A * | 7/2000 | Yerger ................... | A63B 27/00 |
| | | | | 182/136 |
| 6,264,000 | B1 * | 7/2001 | Johnson ........................ | 182/136 |
| 7,794,374 | B1 * | 9/2010 | Park ................... | A63B 21/0004 |
| | | | | 482/122 |
| 2003/0042076 | A1 * | 3/2003 | Ulrich .................... | A63B 27/00 |
| | | | | 182/136 |
| 2005/0072632 | A1 * | 4/2005 | Muhich ......................... | 182/187 |
| 2007/0000726 | A1 * | 1/2007 | Berkbuegler ................. | 182/187 |
| 2007/0272484 | A1 * | 11/2007 | Helms ............................. | 182/3 |
| 2008/0156586 | A1 * | 7/2008 | Pestrue ........................ | 182/136 |
| 2009/0272709 | A1 * | 11/2009 | Nessner et al. ............... | 212/270 |
| 2010/0270107 | A1 * | 10/2010 | Ruis .............................. | 182/235 |

\* cited by examiner

*Primary Examiner* — Charles A Fox
*Assistant Examiner* — Kristine Florio
(74) *Attorney, Agent, or Firm* — Tumey L.L.P.

(57) ABSTRACT

A safety system for a two piece tree climbing stand includes a safety cable that is secured to the climbing cable of the tree stand so as not to interfere with the two pieces of the stand as the tree stand is maneuvered up a tree. An elongated resilient sleeve is adapted to surround both the climbing cable and the safety cable so that the safety cable is secured to the tree climbing cable until the sleeve is removed. The safety cable is adapted to be secured to the safety harness worn by the tree climber and to the climbing cable of the tree stand.

4 Claims, 3 Drawing Sheets

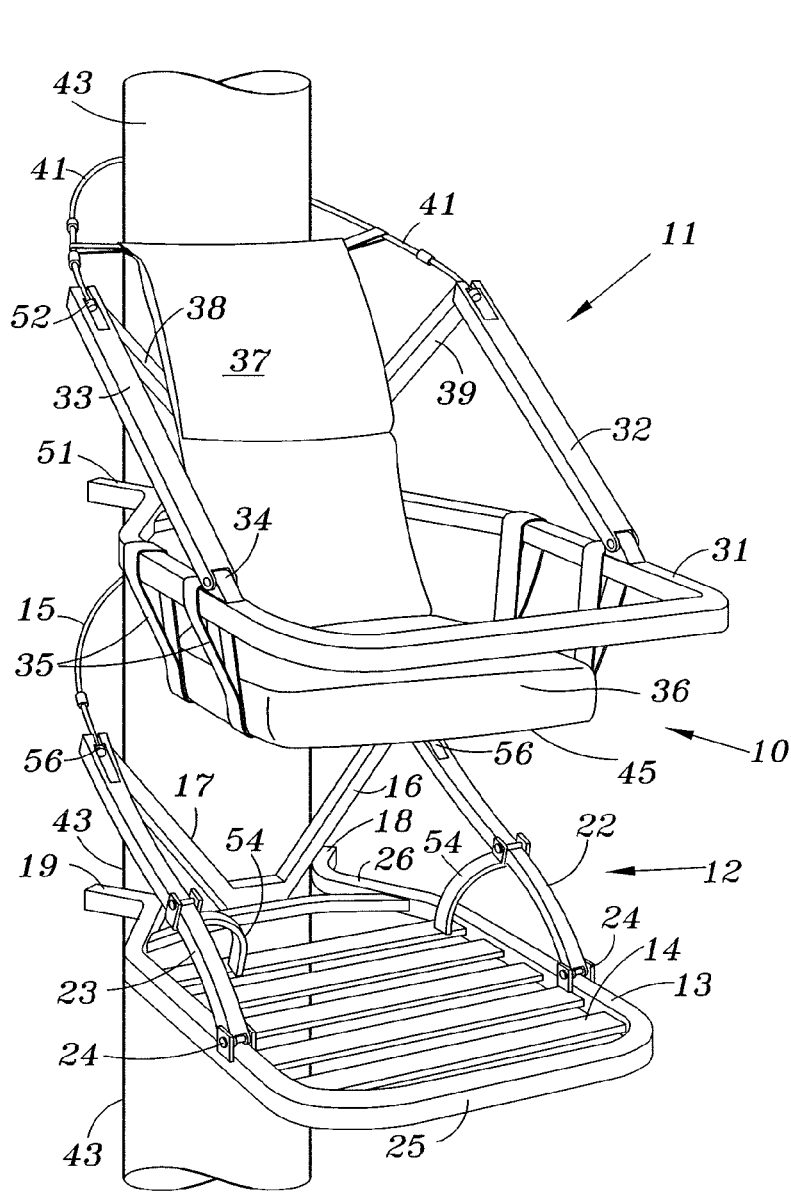
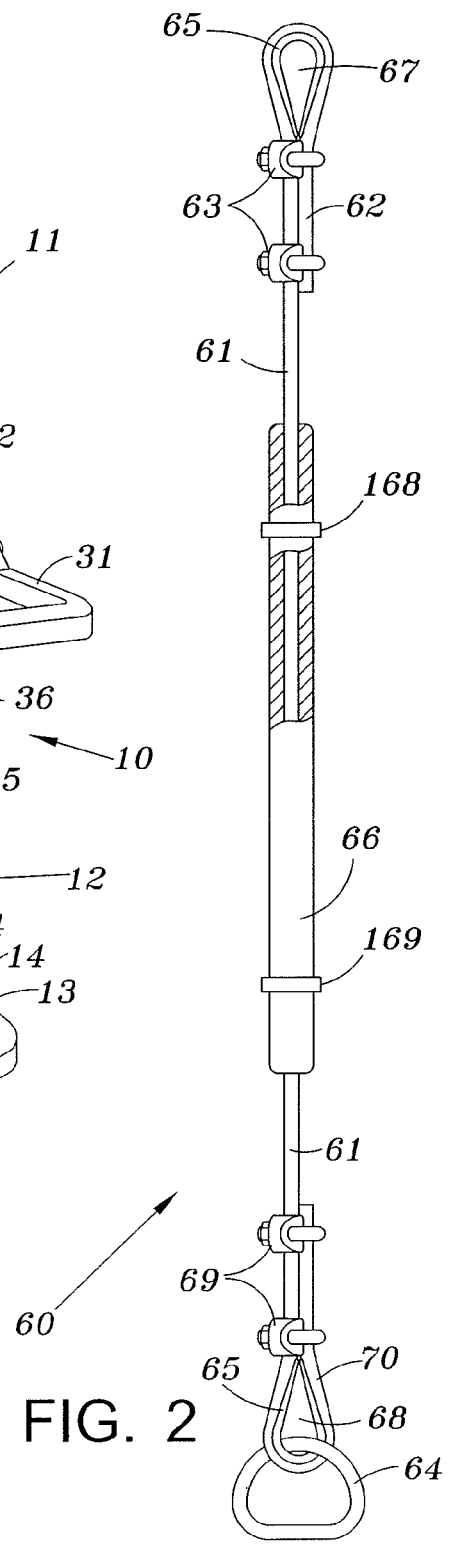
FIG. 1
FIG. 2

SAFETY HARNESS SYSTEM FOR A TWO PIECE CLIMBING TREE STAND

This application is a divisional of U.S. patent application Ser. No. 13/900,297 filed on May 22, 2013.

BACKGROUND OF INVENTION

1. Field of the Invention

This invention is directed to a safety harness system for a two piece climbing tree stand typically used for hunting purposes. The harness system is designed to protect the tree climber from falling at all times when ascending, while hunting and when descending the tree using a two piece tree stand.

2. Description of Related Art

Two piece climbing tree stands are known in the art and include a first piece adapted to support a user's feet and a second piece including a seat for the user as the user waits for animals to appear. Such a system is disclosed by Yerger in U.S. Pat. No. 6,206,138. As disclosed by Yerger at the time of his invention a separate flexible belt was used that wrapped around the tree and was attached to a harness worn by the hunter. As explained by Yerger, the belt was prone to interfere with the movement of the two pieces of the tree stand as the user ascends or descends the tree. Yerger's solution was to provide a stiffening means to the belt and to releasably attach the stiffened belt to the upper portion of the tree stand using an attachment device such as a spring clamp. Yerger's strap can easily become disassociated with the tree stand and is cumbersome to attach to the tree stand especially in the dark as is the case when most hunters arrive at the tree stand and ascend the tree. Yerger removes his strap each time he disassembles the stand and must reassemble, normally in the dark, each time he assembles the tree stand, whereas according to the current invention, the safety strap is permanently attached and requires no assembly at the hunting site.

BRIEF SUMMARY OF THE INVENTION

Applicant's invention involves permanently attaching a safety cable to the upper portion of the tree stand so that the safety cable does not have to be removed from the stand during either assembly or disassembly in the woods. In one embodiment a flexible sleeve surrounds the safety cable and the tree engaging strap of the upper tree stand piece so that the safety cable and the cable associated with the upper tree stand piece are positioned within and held together by the flexible sleeve.

BRIEF DESCRIPTION OF THE SEVERAL VIEWS OF THE DRAWING(S)

FIG. 1 is a perspective view of a typical two piece tree climbing stand.

FIG. 2 is a perspective view of a safety cable according to an embodiment of the invention.

DETAILED DESCRIPTION OF THE INVENTION

Figure 3:
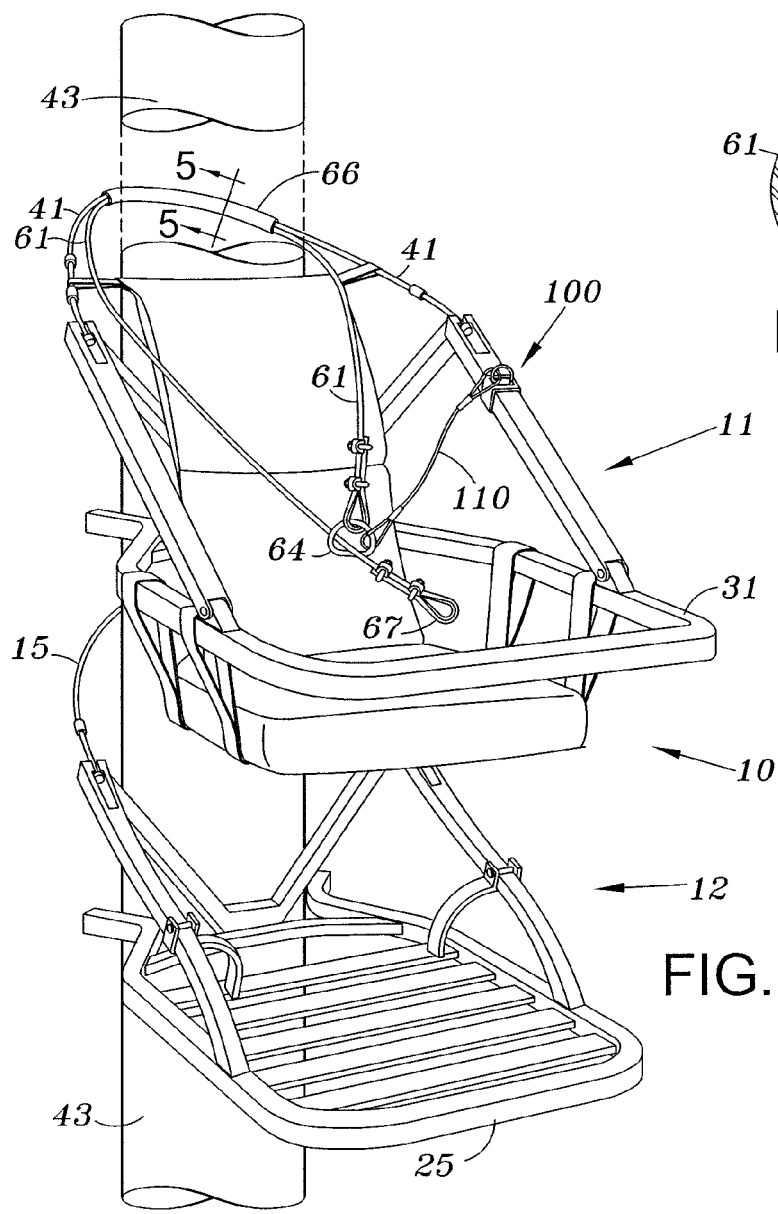
FIG. 3 is a perspective view of the safety cable attached to the climbing cable of the upper tree stand piece.

As shown in FIG. 1, the tree stand assembly 10 includes a lower foot supporting platform 12 and an upper support 11 for a seat 45 including a first horizontal cushion 36 and a second vertical back supporting cushion 37. The seat support 45 may be suspended by a plurality of straps 35 that extend from seat supporting frame 31. Upper support piece 11 also includes two front brackets 33 and 32 that are pivotably attached at one and to seat support frame at 34 and are attached at a second end to rear brackets 38 and 39. Rear brackets 29 are also attached to a tree engaging gripping platform 51 which may include teeth not shown. A tree engaging cable 41 is adjustably secured to front and rear brackets 33, 32, 38 and 39 as shown in FIG. 1 at 52.

Lower tree stand piece 12 includes a platform including an outer frame member 25 and a plurality of slates 14 extending between the sides of frame 13 thereby forming a foot support for the user. Lower tree stand piece also includes a pair of front brackets pivotably attached at one end to the frame 23 and attached at their other ends to rear brackets 16 and 17. Rear brackets 17 and 16 are secured to a tree engaging platform 18 having teeth not shown therein. A tree trunk engaging cable 15 is adjustably secured to the front and rear brackets at 56. A pair of feet engaging stops 54 are positioned and extend from brackets 22 and 23 to transmit upward movement to the lower piece 12 as the tree climber raises his feet.

The operation of climbing a tree with the two piece tree stand is well known in the art. A user will first position the two pieces with cables 15 and 41 extending around the tree. The user will grab frame 31 and raise lower piece 12 a given amount with the user's feet and then set the lower piece in place by virtue of cable 15 and teeth not shown. At this point the user raises upper piece 11 a given amount with his arms and then resets it against the tree. The process is repeated until the user reaches the desired position height.

FIG. 2 illustrates an embodiment of the safety cable 60 according to the invention. Safety cable 60 includes a flexible cable 61 which may be made of any suitable flexible material such as steel cable, nylon rope, etc. At a first end 62 the cable is curved over a generally oval shaped guide member 65 that has a u-shaped channel for receiving cable 61. The cable is directed through a 180° turn by guide member 65 and is secured to itself at 63 by any well-known clamping mechanism 63, thus forming an eyelet 67. The second end 70 of the cable includes a similar guide member 65 over which cable 61 is routed and attached to itself at 69 to form another eyelet 68. A "D" ring 64 is attached to eyelet 68. The "D" ring opening is sufficiently large to allow first end 62 of the safety cable to pass through it as will be explained below.

A tubular sleeve member 66 composed of a relatively flexible and/or resilient material such as rubber or the like is adapted to slip over a portion of cable 61. The sleeve has an internal passageway having a diameter sufficient to accommodate the climbing cable of the upper member of the tree stand and cable 61. The sleeve may be slit along its longitudinal axis to allow the sleeve to be placed over the climbing cable and the safety cable. One or more securing devices 168 and 169, such as a band clamp or tie may also be provided to secure the sleeve over the cables.

FIG. 3 illustrates the manner in which safety harness 60 is attached to the upper portion 11 of the tree climbing stand. Cable 61 is of a length greater than that of tree engaging cable 41. A portion of cable 61 intermediate its ends is positioned next to the portion of cable 41 that extends around the tree. Sleeve 66 of the safety harness is placed around both cable 41 and cable 61 so that the safety harness is releaseably attached to tree engaging cable 41 which itself is adjustably fixed to upper member 11. Second end 70 of safety harness 60 is attached to the upper end of bracket 32 by a resilient rubber strap 110. The first end of 62 of the safety harness passes through D-ring 64 and is attached to a portion of a safety harness worn by the climber. In this manner, the safety cable is attached to the upper climbing member and does not interfere with the upper or lower members of the tree climbing stand as the user climbs the tree.

Figure 4:
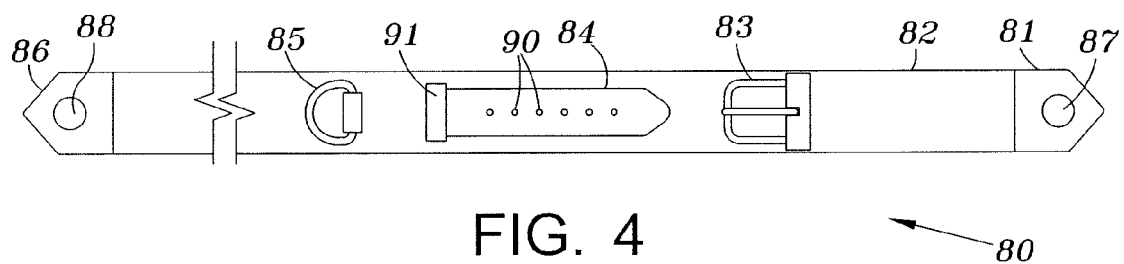
FIG. 4 is a top view of an adjustable safety lanyard usable with the safety cable.

FIG. 4 illustrates an embodiment of an adjustable safety lanyard 80 usable with the safety cable. Lanyard 80 includes a strap 82 of flexible material such as nylon or canvas. An aperture 87 is provided on end 81 of the lanyard. A buckle assembly 83 is positioned on a top surface of strap 82. A flexible tongue 84 having a plurality of holes 90 is secured to the top portion of the strap so that tongue can be placed and secured within buckle assembly 83 to shorten the overall length of the lanyard.

Figure 5:
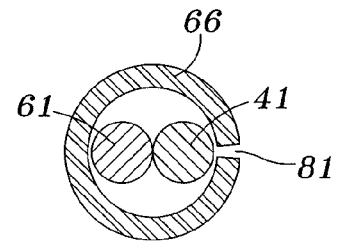
FIG. 5 is a cross-sectional view of the sleeve encircling the two cables.

As shown in FIG. 5, sleeve 66 has an internal diameter sufficient to accommodate tree engaging cable 41 and safety cable 61. The sleeve can be provided with a slit 81 along its entire length so that cables 41 and 61 can be positioned within the sleeve as shown in FIG. 3.

A center ring 85 is positioned on the lanyard. Aperture 87 is adapted to connect to the safety harness worn by the user. A second end 86 of the lanyard has an aperture 88 for attaching the second end to the safety cable at 64 using any suitable clamp.

Figure 6:
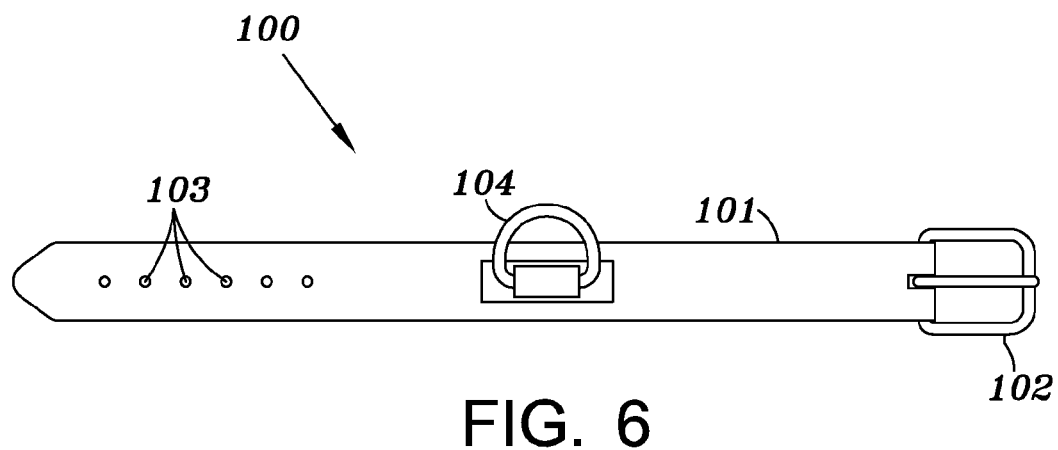
FIG. 6 is a top view of a strap adapted to be attached to upper frame member 32.

FIG. 6 illustrates a strap 100 which is adapted to be attached to upper frame member 32. The strap includes a band 101 of flexible material having a buckle 102 located at one end and a tongue having apertures 103 at a second end.

Figure 7:
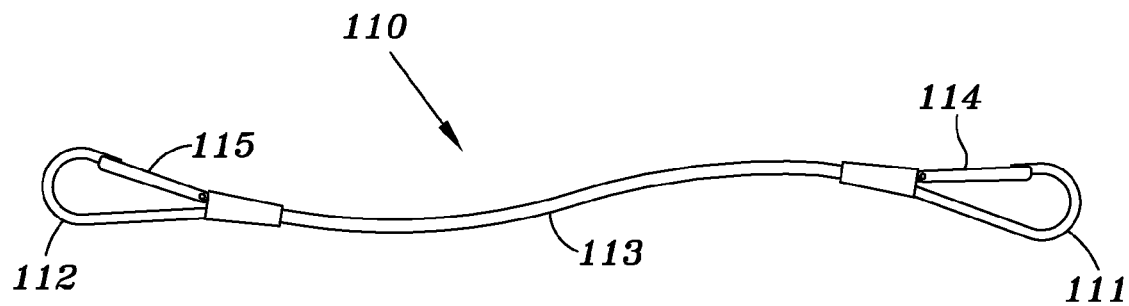
FIG. 7 is a perspective view of an expandable cord adapted to be attached to the strap of FIG. 6 and D-ring 64.

FIG. 7 illustrates a flexible, extendable, resilient cord assembly 110. Cord assembly 110 has a flexible, extendable and/or resilient cord 113 having a hook attachment device 111 and 112 at each end. Hook attachment devices 111 and 112 may include a spring biased latch 114 and 115 as is known in the art for releasably attaching the cord to a ring member.

In use, strap 100 is attached to front bracket 32 of the upper support piece 11. One end of the expandable cord assembly 110 is connected to the D-ring 104 of strap 100 and a second end of the cord assembly 100 is connected to end 62 of the safety cable 60. This insures that the safety cable is permanently attached to the upper piece of the climbing tree stand and helps maintain the safety cable in a position proximate to bracket 32.

Although the present invention has been described with respect to specific details, it is not intended that such details should be regarded as limitations on the scope of the invention, except to the extent that they are included in the accompanying claims. For example, the safety harness system can be used with any tree climbing stand that includes a tree engaging climbing cable, and is not limited to use with the tree climbing stand illustrated herein.

I claim:

1. A two piece tree climbing stand comprising:
an upper support including a seat for a hunter, a first tree engaging gripping member, and a first cable adapted to surround a portion of the tree;
a lower foot support including a second tree engaging member, and a second cable adapted to surround a portion of the tree; and a safety cable attached to the first cable, said safety cable having a connector for connection to a safety harness worn by a hunter;
wherein the safety cable is attached to the first cable by a tubular element having an axially extending slit, an internal diameter of the tubular element being sufficient in size to accommodate the safety cable and the first cable; and
one or more securing devices positioned over the tubular element to secure the tubular element over the safely cable and the first cable.

2. A tree climbing stand as claim 1 further including an expandable cord connected to an end of the safety cable and connected to the upper support.

3. A tree climbing stand according to claim 2 further including a strap attached to the upper support, the expandable cord being connected to the upper support via the strap.

4. A tree climbing stand according to claim 1 wherein:
said safety cable has a first end and a second end;
said safety cable having a ring member at said second end allowing the first end to pass through the ring.

* * * * *